July 15, 1969  H. K. MUTTERER  3,455,228
PHOTOGRAPHIC SHUTTER, AND MORE PARTICULARLY A SELF-COCKING
SHUTTER, HAVING ONE OR MORE RECIPROCABLE SHUTTER BLADES
Filed Oct. 27, 1966  2 Sheets-Sheet 1
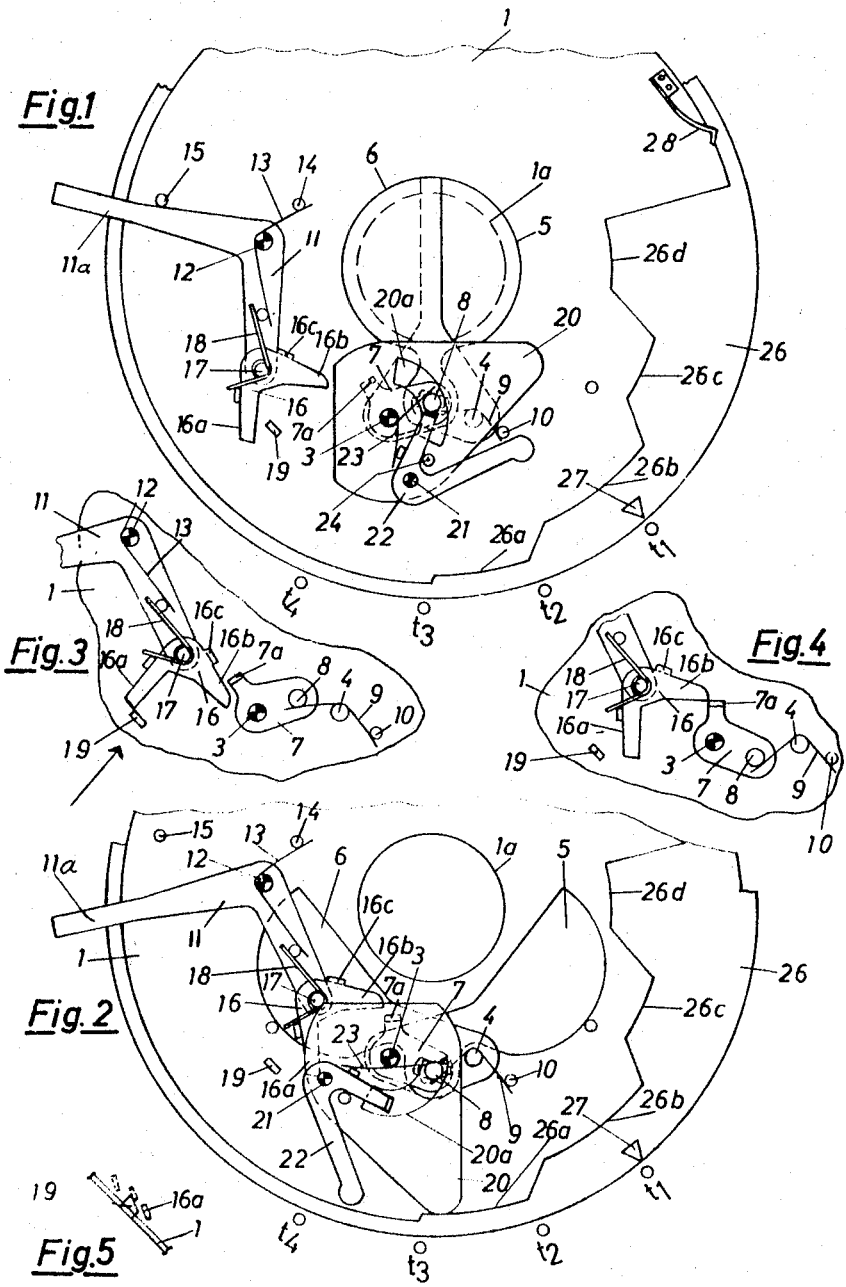
INVENTOR
Heinz K. Mutterer
BY Amster & Rothstein
ATTORNEYS INVENTOR
Heinz K. Mutterer
BY Amster & Rothstein
ATTORNEYS

United States Patent Office 3,455,228
Patented July 15, 1969

3,455,228
PHOTOGRAPHIC SHUTTER, AND MORE PARTICULARLY A SELF-COCKING SHUTTER, HAVING ONE OR MORE RECIPROCABLE SHUTTER BLADES
Heinz Karl Mutterer, Sprollenhaus, Germany, assignor to Prontor-Werk Alfred Gauthier G.m.b.H., Calmbach, Black Forest, Germany, a corporation of Germany
Filed Oct. 27, 1966, Ser. No. 590,065
Claims priority, application Germany, Oct. 30, 1965, P 38,012
Int. Cl. G03b 9/14
U.S. Cl. 95—62    9 Claims

ABSTRACT OF THE DISCLOSURE

A photographic camera shutter having a reciprocable shutter blade system is provided with a pivoted retarding weight coupled to the shutter blade system so as to overswing the blades against the action of a spring when the blades are opened. The weight continues to pivot until it comes into contact with a retarding surface at which time it reverses direction and pivots back towards its initial position, closing the shutter blades as it traverses the return path. The position of the retarding surface can be adjusted to control the exposure time of the shutter.

---

The invention concerns a photographic shutter and more particularly a self-cocking shutter having one or more reciprocable shutter blades which are driven by means of an actuating member fashioned as a lever or the like.

In photographic shutters in which the cost of a conventional escapement timer comprising several gear wheels, a ratchet and an anchor member is disproportionately high relative to the overall expenditure, it is known to permit the shutter blades to swing out to a greater or lesser extent beyond the lens opening for the purpose of obtaining varying exposure times. Because of the structural and spatial conditions in the shutter housing, certain limitations are involved, inasmuch as the region which is to be swept by the shutter blades cannot be indefinitely extended particularly when the longer exposure times are desired. This in turn implies that, when using the prescribed dimensions, only a relatively small time range is available. Furthermore, the accuracy of such exposure times is reduced owing to the difficulty of firmly defining the point of reversal of the shutter blades.

The object of the present invention is to avoid this deficiency of known shutter arrangements, and to provide a shutter of the kind referred to above without appreciable increase in cost, with a maximum of extension of the available exposure time range and an improvement in the accuracy of the exposure times obtained.

To solve this problem it is proposed in accordance with the invention that the shutter blade assembly, which has one or more reciprocable blades driven by an actuating lever, has a retarding weight associated therewith, which when the blades are fully opened, overswings against the action of a spring to delay closure of the said blades. The advantage of this arrangement is that the shutter blades need never swing out beyond a predetermined limited width of opening, whilst the retarding weight may be associated with the shutter blade system or its drive in any manner required by the structural and spatial conditions of the shutter assembly, for the purpose of obtaining an increased range of exposure times.

In a preferred embodiment of the apparatus in accordance with the invention both from a structural and functional point of view, the retarding weight is associated with an actuating lever which is in driving engagement with the shutter blades, and a coupling permitting relative movement between these members is provided. To obtain maximum strength and functional reliability whilst maintaining a simple method of construction, the retarding weight is formed as a plate mounted coaxially with the actuating lever, and the plate is provided with an arcuate slot extending concentrically with its pivot, with which slot a driver pin secured on the actuating lever engages; the length of the slot is such that the retarding weight can move free of the pin to its maximum displacement.

For the purpose of reducing the cost of the device the driving means in such an arrangement may serve also to drive the shutter blade assembly, so that additional power transmitting means to couple the retarding weight to the opening movement of the shutter drive are unnecessary.

In order with relatively simple structural means to effect such control of the shutter assembly that at least the shortest exposure time is not influenced by the retarding weight, in accordance with a feature of the invention the retarding weight carries a variable-position coupling member, the said member being moved into or out of the path of the driver pin mounted on the actuating lever for the purpose of engaging or disengaging the retarding weight from the shutter assembly.

Intermediate times of varying magnitudes may be obtained within the available shutter time range, by providing means for limiting the degree of movement of the retarding weight. A structurally simple but at the same time functionally reliable operating embodiment is obtained according to a further feature of the invention by the fact that for limiting the swing of the retarding weight several stop surfaces varying in height are formed thereon, or on a manually actuated setting member. In accordance with a further feature of the invention the coupling member provided for the operational engagement of the acuating lever with the retarding weight may be formed as a two-armed rotatably mounted lever, which is adapted to be removed from the movement range of the driver pin by means of a control face formed on a shutter time setting member provided with stop faces.

The invention will now be described in connection with the accompanying drawings, in which:

FIG. 1 is a plan view of a shutter assembly in the closed position with the retarding weight set to the longest exposure time $t_1$;

FIG. 2 is the same shutter assembly moved into the open position by the cocking and release mechanism, with the retarding weight swung to maximum width;

FIGS. 3 and 4 show the co-operation of the driving pawl arranged on the cocking and release lever with the actuating lever of the shutter blade assembly in different phases of movement;

FIG. 5 is a side view of the arrangement looking in the retarding weight swung to maximum width;

Figure 6:
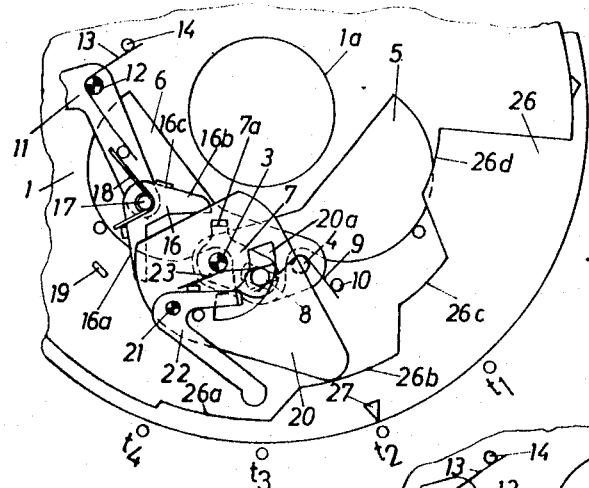
FIG. 6 is the shutter assembly shown in a fragmentary view in the reversal phase of the shutter blade assembly after previous setting to the exposure time $t_2$.

In the drawing numeral 1 denotes a base plate of the kind acting in known manner in photographic shutters as mounting for the individual structural elements of the driving mechanism for the opening and closing movements of the shutter blades. The base plate 1 has an exposure opening 1a which is covered and uncovered by means of two shutter blades 5 and 6 rotatably mounted on pins 3 and 4. Both shutter blades 5 and 6 are in pin and slot engagement with a driver pin 8 arranged on the actuating lever 7. The actuating lever 7 is rotatably mounted on the pin 3 serving to mount the shutter blade 5. The two shutter blades 5 and 6 are retained in the closed position by means of a coil spring 9 located on a pin 4, which spring is supported at one end against a fixed pin 10 and at the other end against the driver pin 8 of the actuating lever 7.

To drive the actuating lever 7, which is provided with a bent-over projection 7a and is in operational engagement with the two shutter blades 5 and 6, a bell-crank cocking and release lever 11 is provided, mounted on a fixed bearing pin 12. A return spring 13, which at one end is supported against a fixed pin 14 and at the other end against the cocking and release lever 11, is provided for the purpose of retaining this lever in abutment against a fixed pin 15 defining its normal position. The cocking and release lever 11 is provided at one end with a finger release 11a, whilst at the other end it supports a driving pawl 16 having two projections 16a and 16b arranged at an angle to the plane of the pawl. The pawl is rotatably mounted on the end of the lever 11 by means of a pin 17, and retained firmly against the cocking and release lever 11 by means of a projection 16c and a powerful coil spring 18. The arm 16a of the driving pawl 16 co-operates with a fixed stop 19 mounted on the base plate 1, whilst the other arm 16b is adapted to co-operate with the projection 7a of the actuating lever 7.

The shutter arrangement shown permits exposure times varying in duration to be obtained, because the shutter blade system has a retarding weight associated therewith which is connected displaceably to the shutter blade system so that in the reversal phase of the shutter blades it swings beyond their point of reversal against the action of a return spring. For this retarding weight a plate 20 is used, mounted rotatably on the pin 3 serving for mounting the shutter blade 5. An arcuate slot 20a is machined in the plate extending concentrically with its axis of rotation, the driving pin 8 providing the driving connection of both shutter blades 5 and 6 extending into this slot. The arcuate slot 20a has such a length that the plate 20 may execute a certain excess movement when the actuating lever 7 displacing the shutter blades 5 and 6 into the open position has reached the point of reversal of the blades. The arcuate slot 20a, for reasons to be given in detail below, may also be extended to such a length that the driver pin 8 of the actuating lever 7 may move freely therein during the opening movement of the shutter blades 5 and 6.

To permit the braking weight to be engaged with or disengaged from the shutter blade system 5, 6 a coupling member 22 formed as a two-armed angle lever is rotatably mounted on the plate 20 by means of a pivot pin 21. A coil spring 23 arranged on the bearing pin 3 is supported at one end against the driver pin 8 and at the other end against the lever 22, and retains the latter in abutment against an end stop 24 also arranged on the plate. When the coupling lever 22 assumes a position determined by the stop 24, the arm of the lever facing the driver pin 8 is located in the movement range of this pin. The coil spring 23 engaging both the driver pin 8 and the coupling lever 22 also serves as return spring, since it exerts a constant torque in an anti-clockwise direction on the retarding weight 20.

A setting member 26, which is formed as a ring and rotatably mounted on the base plate 1, is adapted to co-operate with the coupling member 22. The setting member 26 has several stop faces 26a, 26b and 26c provided to limit the swing-out movement of the retarding weight 20, the stop faces being of varying height with reference to the circumference of the ring. Apart from these stop faces the setting member 26 is also provided with a control face 26d the object of which is to move the coupling lever 22 so that its arm facing the driver pin 8 may assume a position outside the movement path of the pin. The different setting positions into which the setting member 26 may be placed are only indicated in the drawings by the designations $t_1$ to $t_4$, whilst the setting member itself has a setting mark 27 indicated thereon. Concerning the setting positions $t_1$ to $t_4$, the longest exposure time is attained when the mark 27 registers with the setting position $t_1$. This permits the retarding weight to swing out to the maximum amplitude, as shown in FIG. 2. When the setting member 26 is moved to position $t_2$, the path of the retarding weight 20 is shortened during shutter action due to the weight striking against the face 26b. A further shortening of the movement and hence the exposure time is obtained when the mark registers with the setting position $t_3$, whereby the swing-out movement of the retarding weight is terminated by the stop face 26c. Finally, when the mark 27 registers with the setting position $t_4$, the control face 26d moves the coupling lever 22 out of the movement range of the driver pin 8 that the latter during the shutter action is permitted to swing through freely without engaging the retarding weight 20. To arrest the setting member 26 a spring catch 28 is provided, which clicks in the setting position $t_1$ to $t_4$ in accordance with notches formed in the setting member.

Figure 7:
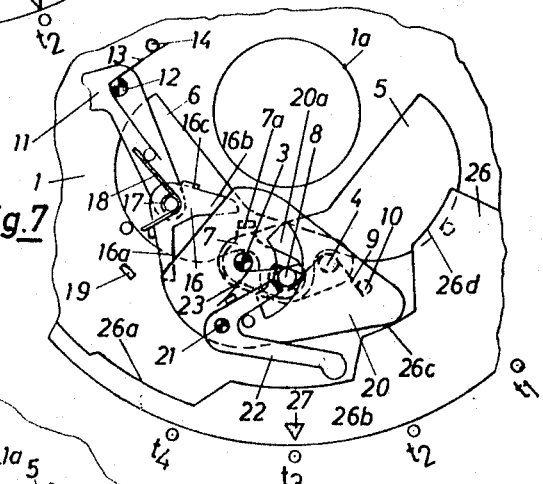
FIG. 7 is a fragmentary view of the shutter arrangement in the reversal phase, after previous setting to the exposure time $t_3$.
Figure 8:
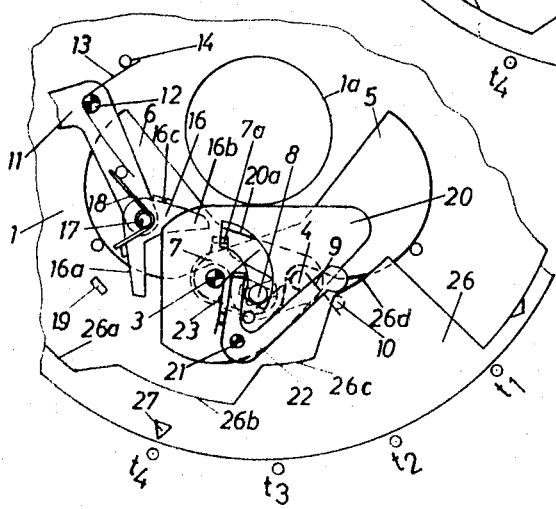
FIG. 8 is a fragmentary view of the shutter arrangement in the reversal phase after previously disengaging the braking weight, i.e. after movement of the setting member to the shortest exposure time $t_4$.

The method of operation of the shutter arrangement is as follows:

If the setting member 26 serving the preselection of the exposure time is set to $t_1$, as shown in FIG. 1, the coupling lever 22 arranged on the retarding weight 20 assumes its operative position, there being a connection between actuating lever 7 and the braking weight 20. Then, if the cocking and release lever 11 is actuated, it executes a rotary movement in an anti-clockwise direction about the pin 12. The result of this is that the arm 16a of the driving pawl 16 encounters the fixed pin 19, so that the pawl during the continued rotary movement of the cocking and release lever, executes a rotary movement in the direction opposite to the action of spring 18, about the pin 17. The driving pawl 16 finally assumes the position as shown in FIG. 3 in which the disengagement of the pawl from the fixed pin 19 is imminent. When this occurs, the tensioned driving spring 18 rotates the driving pawl 16 in an anti-clockwise direction about the pin 17 thus acting by the arm 16b on the extension 7a. The actuating lever 7 is rotated clockwise (FIG. 4), displacing the shutter blades 5 and 6 into the open position shown in FIG. 2. When the driving pawl 16, as shown in FIG. 4, finally slips off the actuating lever 7, the retarding weight 20 executes a swinging movement beyond the reversal point as a result of the kinetic energy imparted to it by the actuating lever during the opening movement, the movement continues until the weight strikes against the stop 26a as shown in FIG. 5. The return spring 23 engaging the coupling lever 22 and exerting a torque on the retarding weight which torque increases with the swinging-out of the weight now causes the latter to be accelerated in the opposite direction of rotation. In course of the return movement the coupling lever 22 again strikes against the driver pin 8 and hence returns the actuating lever 7 and the shutter blades 5 and 6 into the closed position. Hence the amplitude of movement of the weight determines the duration of exposure in accordance with the part of the stop face 26a which the weight encounters. If the mark of the setting member 26 registers with the setting position $t_2$ (FIG. 6) or $t_3$ (FIG. 7) the shutter action takes place in an analogous fashion, but with the difference that in one case the braking weight 20 strikes against the stop edge 26b, and in the other case against the stop edge 26c, resulting in a reduction of the amplitude of movement of the weight and hence a shortening of the exposure time. If the mark 27 of the setting member 26 registers with the setting position $t_4$ (FIG. 8), then connection between actuating pin 8 and the retarding weight 20 does not take place, so that during shutter action the actuating lever moves without engaging the retarding weight.

The invention is not limited to shutter assemblies exactly as described above and as shown in the drawings, but may be employed in all shutter assemblies the shutter blade system of which executes a reciprocating movement during exposure. Again, the invention may quite readily be incorporated in shutters having a shutter blade assembly executing a rectilinear opening and closing movement during exposure. The retarding weight may also be used in a shutter system using only a single shutter blade, the retarding weight being coaxially mounted with the shutter blade and provided with a driving means such as a pin and slot connection permitting relative movement between the weight and the blade.

I claim:

1. A photographic shutter having a reciprocable shutter blade system, means for opening and closing said shutter blade system, a pivoted retarding weight, means for coupling said weight to said shutter blade system, a return spring cooperating with said weight, said weight being arranged for pivoted movement so that it can swing out beyond the reversal point of said blade system opposite to the direction of the force of said return spring, and means actuated by said return spring to close said blade system.

2. A photographic shutter as recited in claim 1, with an actuating lever which is in operational engagement with said shutter blade system, and driving engagement means between said lever and said weight permitting relative overswing movement therebetween.

3. A photographic shutter as recited in claim 1 comprising said retarding weight formed as a plate, a common pivot for said weight and said actuating lever, an arcuate slot in said plate extending concentrically with said pivot and a driver pin on said actuating lever and projecting into said slot, the length of said slot being such that said retarding weight can rotate about said pivot independently of said pin.

4. A photographic shutter as recited in claim 1 comprising a pivoted actuating lever, and drive coupling means between said lever, said weight, and said shutter blade system.

5. A photographic shutter as recited in claim 1 in which said retarding weight carries a variable-position coupling member, a pivoted actuating lever, a driver pin on said actuating lever, and means for displacing said coupling member into or out of the path of said driver pin to engage or disengage said retarding weight from said actuating lever.

6. A photographic shutter as recited in claim 1, provided with means limiting the pivotal motion of said retarding weight.

7. A photographic shutter as recited in claim 6, with a manually movable shutter time setting member having stop surfaces of varying height formed thereon, said member being movable relative to said weight to vary the pivotal overswing thereof.

8. A photographic shutter as recited in claim 6 with a manually movable shutter time setting member with a single stop surface cooperating with said weight, there being stop surfaces of varying height on said weight.

9. A photographic shutter as recited in claim 1 comprising an actuating lever coupled to said blade system, a driver pin on said lever, a two-armed lever pivoted on said weight and adapted to couple it to said actuating lever, and a control surface on a manually movable shutter time setting member said surface being movable into the path of said two-armed lever to move it out of the path of said driver pin.

References Cited

UNITED STATES PATENTS

| 2,478,309 | 8/1949 | Pask | 95—60 |
| 3,033,092 | 5/1962 | Ernisse | 95—59 |
| 3,223,016 | 12/1965 | Rentschler | 95—63 |

NORTON ANSHER, Primary Examiner

LEO H. McCORMICK, Jr., Assistant Examiner

U.S. Cl. X.R.

95—53